United States Patent
Umeno

(10) Patent No.: US 6,668,265 B1
(45) Date of Patent: Dec. 23, 2003

(54) APPARATUS AND METHOD FOR OUTPUTTING SEQUENCE OF VECTORS, DATA RECORDING MEDIUM, AND CARRIER WAVE SIGNAL

(75) Inventor: Ken Umeno, c/o Communications Research Laboratory, Ministry of Posts and Telecommunications 2-1, Nukuikitamachi 4-chome, Koganei-shi, Tokyo 184-8795 (JP)

(73) Assignees: Communications Research Laboratory, Ministry of Posts and Telecommunications, Tokyo (JP); Ken Umeno, Tokyo (JP)

( * ) Notice: Subject to any disclaimer, the term of this patent is extended or adjusted under 35 U.S.C. 154(b) by 0 days.

(21) Appl. No.: 09/531,699

(22) Filed: Mar. 20, 2000

(30) Foreign Application Priority Data

| | | |
|---|---|---|
| Mar. 29, 1999 | (JP) | 11-085744 |
| Dec. 21, 1999 | (JP) | 11-362203 |

(51) Int. Cl.$^7$ .................................................. G06F 1/02
(52) U.S. Cl. ....................................................... 708/250
(58) Field of Search ................................ 708/250–256, 708/270–277, 200

(56) References Cited

U.S. PATENT DOCUMENTS

| | | | | |
|---|---|---|---|---|
| 5,054,066 A | * | 10/1991 | Riek et al. | 380/30 |
| 5,375,170 A | * | 12/1994 | Shamir | 380/30 |
| 5,751,808 A | * | 5/1998 | Anshel et al. | 708/250 |
| 6,141,669 A | * | 10/2000 | Carleton | 708/252 |
| 6,285,761 B1 | * | 9/2001 | Patel et al. | 708/251 |

FOREIGN PATENT DOCUMENTS

JP    10283344 A2    10/1998

OTHER PUBLICATIONS

K. Umeno et al., Spreading sequences using periodic orbits of chaos for CDMA, 1999, IEEE Electronics Letters, vol. 35, No. 7, p. 545–546.*

Hsiao–Kuang Wu et al., The Sharing Session Key Component (SSKC) Algorithm for End–to–End Secure Wireless Communication, 2000, IEEE, p. 242–250.*

H. M. Keys et al., On the Security of the CAST Encryption Algorithm, 1994, IEEE, p. 332–335.*

Ulan, von Neumann, "On Quasi–fixed Points for Transformation in Function Spaces," *Bulletin of the Mathematical Society*, pp. 1120 (Nov. 1947).

Adler, Rivlin, "Ergodic and Mixing Properties of Chebyshev Polynomials," *Proceedings of the American Math Society*, pp. 794 (1964).

Umeno, "Method of Constructing Exactly Solvable Chaos," *Physical Review E*, v. 55, No. 5 (May 1997).

* cited by examiner

*Primary Examiner*—Chuong Dinh Ngo
*Assistant Examiner*—Chat C Do
(74) *Attorney, Agent, or Firm*—Luce, Forward, Hamilton & Scripps LLP

(57) ABSTRACT

A first storage in an apparatus for outputting a sequence of vectors stores vector x having the dimension at least 1, a first calculator calculates vector function x'=f(x) which utilizes a first rational vector map f to which the stored vector x is input, a second storage stores vector y having the dimension at least 1, a second calculator calculates vector function y'=g(x, y) which utilizes a second rational vector map g to which the stored vectors x and y are input, an output outputs vector z' which is association of the resultant vectors x' and y', a first update updates the first storage by storing the resultant vector x', and a second update updates the second storage by storing the resultant vector y'.

12 Claims, 10 Drawing Sheets

APPARATUS AND METHOD FOR OUTPUTTING SEQUENCE OF VECTORS, DATA RECORDING MEDIUM, AND CARRIER WAVE SIGNAL

BACKGROUND OF THE INVENTION

1. Field of the Invention

The present invention relates to an apparatus and method for outputting a sequence of vectors, a data recording medium, and a carrier wave signal.

More particularly, the present invention relates to an apparatus and method for outputting a sequence of higher dimensional random vectors whose limiting distribution is expressed by an analytical density function, after associating two vector sequence generating methods by which sequences of random vectors whose limiting distribution is expressed by a known analytical density function are output, and a data recording medium storing a program which realize the above vector sequence output.

2. Description of the Related Art

Many random number generating methods utilizing recurrence formulas have been known conventionally. Many fields require random number generation. Monte-Carlo method for simulation in physics and engineering fields utilizes the random numbers.

CDMA (Code Division Multiple Access) technology for mobile phone communication assigns PN (Pseudo Noise) code to each user in order to share the limited band among many users. The PN code is generated based on the random numbers.

Moreover, public key encryption employed in telecommunication technologies utilizes the random numbers for generating public keys. Demands for such the encryption has been developing because stronger protection has been required as telecommunications such as internet has been widely used.

Traditional methods for generating the random numbers usually utilize recurrence formulas. Especially, multiplication recurrence formulas have been used widely for many years. However, such the multiplication recurrence formula also has raised problems regarding to finite periodicity. Recently, rational maps have been applied to the recurrence formulas to generate random numbers as chaos theory has been developing. The rational map is a result of the addition theorem of an elliptic function (including a trigonometric function). Demands for the random number generation by such the method which utilizes the rational map have been developing, because such the method has the following advantages.

(1) Non-cyclical random number sequence generation by which the numbers are proven to be chaotic (thus, aperiodic):

(2) Sequences of rational numbers result from rational number seeds (initial values given to the recurrence formula); and (3) Known analytic function acts as the density function expressing random number distribution.

Known rational maps which bring the above advantages are: an Ulam-von Neumann map (equation 1), a cubic map (equation 2), a quintic map (equation 3), and the like.

$$f(x) = 4x(1-x) \qquad \text{EQUATION 1}$$

$$f(x) = x(3-4x)^2 \qquad \text{EQUATION 2}$$

$$f(x) = x(5-20x+16x^2)^2 \qquad \text{EQUATION 3}$$

Regardless of the different rational maps above, the equation 4 represents a density function expressing distribution of a random number sequence x[i] which results from the following recurrence formula (where $0<\xi<1$; $\xi$ is an arbitrary initial value).

$$x[0]=\xi$$

$$x[i+1]=f(x[i]) \ (i \geq 0)$$

$$\rho(x) = \frac{1}{\pi\sqrt{x(1-x)}} \qquad \text{EQUATION 4}$$

A rational map with a parameter, such as a Katsura-Fukuda map, a generalized Ulam-von Neumann map (equation 5), a generalized cubic map, a generalized Chebyshev map, or the like may be applied to the recurrence formula.

$$f(l, m, x) = \frac{4x(1-x)(1-lx)(1-mx)}{1-Ax^2+Bx^3+Cx^4} \qquad \text{EQUATION 5}$$

where $A = 2(l+m+lm)$ $B = 8lm$ $C = l^2 + m^2 - 2lm - 2l^2m - 2lm^2 + l^2m^2$

For example, if the random number sequence result from the above recurrence formula employing the generalized Ulam-von Neumann map (equation 5), limiting distribution of the resultant random number sequences is expressed by the following density function (equation 6) which includes the parameter of the generalized Ulam-von Neumann map.

$$\frac{1}{K(l,m)\sqrt{x(1-x)(1-lx)(1-mx)}} \qquad \text{EQUATION 6}$$

where $$K(l,m) = \int_0^1 \frac{du}{\sqrt{(1-u^2)(1-lu^2)(1-mu^2)}}$$

The Katsura-Fukuda map is the same as the generalized Ulam-von Neumann map (equation 5) where m=0.

Unexamined Japanese Patent Application KOKAI No. H10-283344 by the inventor of the present invention discloses a technique for generating random numbers with utilizing rational maps. Theoretical backgrounds for the technique are disclosed in the following documents.

S. M. Ulam and J. von Neumann, Bull. Math. Soc. 53 (1947) pp. 1120.

R. L. Adler and T. J. Rivlin, Proc. Am. Math. Soc. 15 (1964) pp. 794.

K. Umeno, Method of constructing exactly solvable chaos, Phys. Rev.E (1997) Vol. 55 pp. 5280–5284.

Conventionally, a random number sequence (a sequence of random one-dimensional vectors) result from the above random number generating method by applying a sequence of scalars (one-dimensional vectors) to the recurrence formula as the seed.

However, such the conventional methods have the following problems.

For carrying out the Monte-Carlo method in dimension at least two, a sequence of random vectors of dimensions at least two is required. However, the conventional random number generating method generates a sequence of random numbers corresponding to a sequence of scalars (one-dimensional vectors). When the Monte-Carlo method is applied to simulation in three-dimensional space, three-value selection from head of the sequence may be required for necessary times. However, such operation causes deviation of random number distribution, thus, error convergence will be poor.

Moreover, the public key encryption requires paired integers as the random number. However, the conventional method can not perform simultaneous generation of the integers to be paired. This will make a security hole, thus, the encryption may be cracked.

Under such the circumstances, there is a great demand for an apparatus and method for outputting a sequence of vectors each of which comprises plural pairs of random numbers each being generated simultaneously as a multi-dimensional random vector, and for expressing distribution of the output vector sequence by an analytic density function.

SUMMARY OF THE INVENTION

The present invention has been made for overcome the above problems. It is an object of the present invention to provide to an apparatus and a method for outputting a sequence of higher dimensional random vectors by associating two vector sequence generating methods by which sequences of random vectors whose distribution is expressed by a known analytic density function are output, and distribution of the resultant sequence of random vectors is expressed by an analytic density function, and to provide a data recording medium storing a program which realizes the above.

To accomplish the above object, the following invention will be disclosed in accordance with the principle of the present invention.

As shown in FIG. 1, an apparatus 100 for outputting a sequence of vectors according to a first aspect of the present invention comprises a first storage 101, a first calculator 102, a second storage 103, a second calculator 104, an output 105, a first update 106, and a second update 107.

(a) the first storage 101 stores vector x of dimension at least 1;

(b) the first calculator 102 calculates vector x'=f(x) which utilizes a first rational vector map f to which the vector x stored in the first storage 101 is input;

(c) the second storage 102 stores vector y of dimension at least 1;

(d) the second calculator 104 calculates vector y'=g(x, y) which utilizes a second rational vector map g to which the vector x stored in the first storage 101 and the vector y of dimension at least 1 stored in the second storage 103 are input;

(e) the output 105 outputs vector z' which is association of the vector x' resulting from the first calculator 102 and the vector y' resulting from the second calculator 104;

(f) the first update 106 replaces the vector x in the first storage 101 with the vector x' which is the result of the first calculator 102; and (g) the second update 107 replaces the vector y in the second storage 103 with the vector y' which is the result of the second calculator 104.

Here, "rational vector map" means a map which converts vector of dimension at least 1 having rational number components into another vector of dimension at least 1 having rational number components.

The rational vector maps f and g may be maps based on the chaos theory (described later) or arbitrary maps applicable to a recurrence formula for random number generation. For example, a map which multiplies a giant prime number to obtain the remainder may be applicable one.

In the apparatus for outputting a sequence of vectors according to the present invention, a density function expressing limiting distribution of a sequence of vectors x, $f(x)$, $f(f(x))$, $f(f(f(x)))$, ... which are obtained after applying 0 or more times the vector x of dimension at least 1 to the first rational vector map f, is represented by an analytic function, and a density function expressing limiting distribution of a sequence of vectors y, $g(\lambda, y)$, $g(\lambda, g(\lambda, y))$, $g(\lambda, g(\lambda, g(\lambda, y)))$, ... which are obtained after applying 0 or more times the vector y of dimension at least 1 to the second rational vector map $g(\lambda, \bullet)$ to which vector $\lambda$ of dimension at least 1 is input as a parameter, is represented by an analytic function having the parameter $\lambda$.

As shown in FIG. 2, an apparatus 100 for outputting a sequence of vectors according to a second aspect of the present invention comprises a first storage 101, a first calculator 102, a second storage 103, a second calculator 104, an output 105, a first update 106, and a second update 107.

(a) the first storage 101 stores vector x of dimension at least 1;

(b) the first calculator 102 calculates vector x'=f(x) which utilizes a first rational vector map f to which the vector x stored in the first storage 101 is input;

(c) the second storage 101 stores vector y of dimension at least 1;

(d) the second calculator 104 calculates vector y'=g(x', y) which utilizes a second rational vector map g to which the vector x' resulting the first calculator 102 and the vector y having dimension at least 1 stored in the second storage 103 are input;

(e) the output 105 outputs vector z' which is association of the vector x' resulting from the first calculator 102 and the vector y' resulting from the second calculator 104;

(f) the first update 106 replaces the vector x in the first storage 101 with the vector x' which is the result of the first calculator 102; and (g) the second update 107 replaces the vector y in the second storage 103 with the vector y' which is the result of the second calculator 104.

The rational vector maps f and g may be maps based on the chaos theory (described later) or arbitrary maps applicable to a recurrence formula for random number generation. For example, a map which multiplies a giant prime number to obtain the remainder may be applicable one.

In the apparatus for outputting a sequence of vectors according to the present invention, a density function expressing limiting distribution of a sequence of vectors x, $f(x)$, $f(f(x))$, $f(f(f(x)))$, ... which are obtained after applying 0 or more times the vector x of dimension at least one to the first rational vector map f, is represented by an analytic function, and a density function expressing limiting distribution of a sequence of vectors y, $g(\lambda, y)$, $g(\lambda, g(\lambda, y))$, $g(\lambda, g(\lambda, g(λ,y))), . . . which are obtained after applying to 0 or more times the vector y of dimension at least 1 to the second rational vector map g(λ, •) to which vector λ of dimension at least 1 is input as a parameter, is represented by an analytic function having the parameter λ.

The first rational vector map f for the apparatus for outputting a sequence of vectors according to the present invention may be a rational map obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

The second rational vector map g of the present invention may be a rational map obtained by an additional theorem of the elliptic function, especially, one of Katsura-Fukuda map, generalized Ulam-von Neumann map, generalized cubic map, and generalized Chebyshev map.

In a case where the rational maps obtained by additional theorem of the elliptic function are selected as the first and second rational vector maps f and g, a density function expressing limiting distribution of the sequence of vectors to be sequentially output by the output 105 will be obtained by a density function for a random number sequence obtained by the selected maps.

As shown in FIG. 3, an apparatus 200 for outputting a sequence of vectors according to a third aspect of the present invention comprises a generator 201, a first output 202, a second output 203, and a third output 204.

(a) the generator 201 receives vector $\zeta$ of dimensions at least 2, and generates vector $\xi$ of dimension at least 1 and vector $\eta$ of dimension at least 1;

(b) the first output 202 receives the vector $\xi$ generated by the generator 201, and outputs vectors x[i] obtained by the following recurrence formula which utilizes a first rational vector map f $x[0]=\xi$ $x[i+1]=f(x[i])$ (where $i \geq 0$);

(c) the second output 203 receives the vector $\eta$ generated by the generator 201 and the vectors x[i] output by the first output 202, and outputs vectors y[i] obtained by the following recurrence formula which utilizes a second rational vector map g $y[0]=\eta$ $y[i+1]=g(x[i], y[i])$ (where $i \geq 0$); and (d) the third output 204 outputs vectors z[i] which is association of the vectors x[i] output by the first output 202 and the vectors y[i] output by the second output 203.

As shown in FIG. 4, an apparatus 200 for outputting a sequence of vectors according to a fourth aspect of the present invention comprises a generator 201, a first output 202, a second output 203, and a third output 204.

(a) the generator 201 receives vector $\zeta$ of dimensions at least 2, and generates vector $\xi$ of dimension at least 1 and vector $\eta$ of dimension at least 1;

(b) the first output 202 receives the vector $\xi$ generated by the generator 201, and outputs vectors x[i] obtained by the following recurrence formula which utilizes a first rational vector map f $x[0]=\xi$ $x[i+1]=f(x[i])$ (where $i \geq 0$);

(c) the second output 203 receives the vector $\eta$ generated by the generator 201 and the vectors x[i] output by the first output 202, and outputs vectors y[i] obtained by the following recurrence formula which utilizes a second rational vector map g $y[0]=\eta$ $y[i+1]=g(x[i+1], y[i])$ (where $i \geq 0$); and (d) the third output 204 outputs vectors z[i] which is association of the vectors x[i] output by the first output 202 and the vectors y[i] output by the second output 203.

In the apparatus for outputting a sequence of vectors according to the present invention, a density function expressing limiting distribution of a sequence of vectors x, f(x), f(f(x)), f(f(f(x))), . . . which are obtained after applying 0 or more times the vector x of dimension at least one to the first rational vector map f, is represented by an analytic function, and a density function expressing limiting distribution of a sequence of vectors y, g(λ, y), g(λ, g(λ, y)), g(λ, g(λ, g(λ, y))), . . . which are obtained after applying 0 or more times the vector y of dimension at least 1 to the second rational vector map g(λ, •) to which vector λ of dimension at least 1 is input as a parameter, is represented by an analytic function having the parameter λ.

The first rational vector map f for the apparatus for outputting a sequence of vectors according to the present invention may be a rational map obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

The second rational vector map g of the present invention may be a rational map obtained by an additional theorem of the elliptic function, especially, one of Katsura-Fukuda map, generalized Ulam-von Neumann map, generalized cubic map, and generalized Chebyshev map.

In these cases, an analytic density function expressing limiting distribution of the output vector sequence is also obtained based on the rational vector maps f and g.

The first output 202 itself may act as the apparatus for outputting a sequence of vectors according to the present invention. This case is realized by the following steps.

(1) Prepare an apparatus X (for outputting a sequence of vectors) which utilizes a rational vector map f and a rational vector map g to which a parameter is input;

(2) Since the result of the apparatus X is regarded as a result of a rational vector map f', another apparatus Y for outputting a further vector sequence is prepared by associating the apparatus X with a further rational vector map g' to which a parameter is input. The apparatus Y can output a sequence of vectors whose dimension is higher than that of the vector sequence output by the apparatus X.

(3) Repeated preparation of apparatuses in such the manner will eventually produce an apparatus for outputting a sequence of arbitrary dimensional random vectors.

A method for outputting a sequence of vectors according to a fifth aspect of the present invention comprises:

(a) the first calculation step of calculating vector x'=f(x) which utilizes a first rational vector map f to which vector x of dimension at least 1 stored in a first storage is input;

(b) the second calculation step of calculating vector y'=g(x, y) which utilizes a second rational vector map g to which the vector x stored in the first storage and vector y of dimension at least 1 stored in a second storage are input;

(c) the output step of outputting vector z' which is association of the vector x' resulting from the first calculation step and the vector y' resulting from the second calculation step;

(d) the first update step of updating the first storage by storing the vector x' obtained by the first calculation step; and (e) the second update step of updating the second storage by storing the vector y' obtained by the second calculation step.

A method of outputting a sequence of vectors according to a sixth aspect of the present invention comprises:

(a) the first calculation step of calculating vector x'=f(x) which utilizes a first rational vector map f to which vector x of dimension at least 1 stored in a first storage is input;

(b) the second calculation step of calculating vector y'=g(x', y) which utilizes a second rational vector map g to which the vector x' resulting from the first calculation step and vector y of dimension at least 1 stored in a second storage are input;

(c) the output step of outputting vector z' which is association of the vector x' resulting from the first calculation step and the vector y' resulting from the second calculation step;

(d) the first update step of updating the first storage by storing the vector x' obtained by the first calculation step; and (e) the second update step of updating the second storage by storing the vector y' obtained by the second calculation step.

In the method for outputting a sequence of vectors according to the present invention, a density function expressing limiting distribution of a sequence of vectors x, f(x), f(f(x)), f(f(f(x))), ... which are obtained after applying 0 or more times the vector x of dimension at least one to the first rational vector map f, is represented by an analytic function, and a density function expressing limiting distribution of a sequence of vectors y, g($\lambda$, y), g($\lambda$, g(X, y)), g($\lambda$, g($\lambda$, g($\lambda$, y))), ... which are obtained after applying 0 or more times the vector y of dimension at least 1 to the second rational vector map g($\lambda$, •) to which vector $\lambda$ of dimension at least 1 is input as a parameter, is expressed by an analytic function having the parameter $\lambda$.

The first rational vector map f for the method for outputting a sequence of vectors according to the present invention may be a rational map obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

The second rational vector map g of the method for outputting a sequence of vectors according to the present invention may be a rational map obtained by an additional theorem of the elliptic function, especially, one of Katsura-Fukuda map, generalized Ulam-von Neumann map, generalized cubic map, and generalized Chebyshev map.

In this case, an analytic density function expressing distribution of the output vector sequence is also obtained based on the rational vector maps f and g.

A program which realizes the apparatus and method for outputting a sequence of vectors according to the present invention may be stored in a data recording medium such as a compact disc, a floppy disk, a hard disk, a magneto-optical disk, a digital versatile (video) disk, a magnetic tape, and a semiconductor memory apparatus.

The program may be distributed by a carrier wave signal.

A data processor having a storage, a calculator, an output apparatus, and the like, for example, a general purpose computer, a video game apparatus, a PDA (Personal Data Assistance), a mobile phone, and the like acts as the apparatus for outputting a sequence of vectors or for realizing the method, by executing the program stored in the data recording medium according to the present invention.

The data recording medium storing the program according to the present invention may be distributed or merchandised separately from the data processor apparatus.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 5:
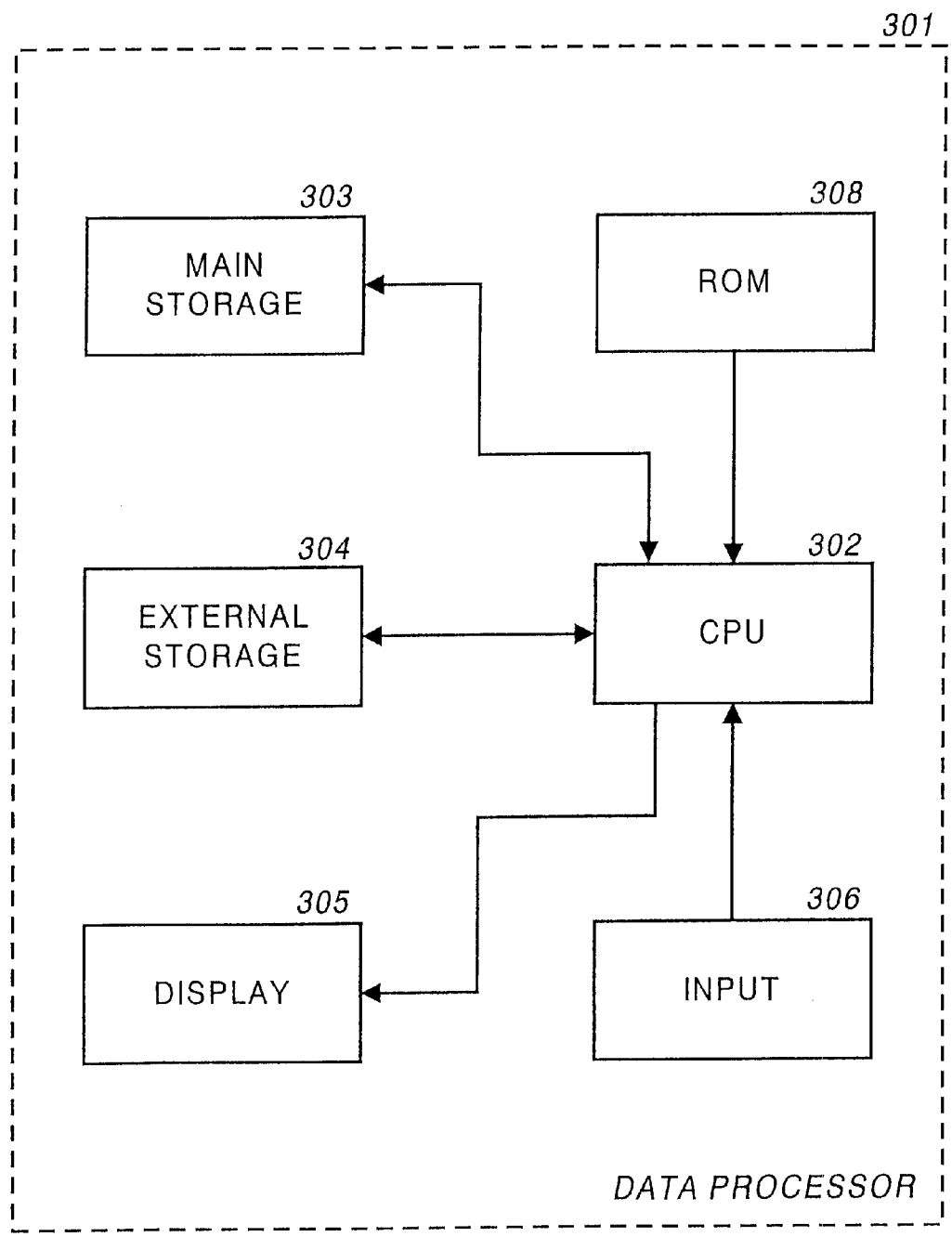
FIG. 5 is a block diagram showing the structure of a data processor which acts as the apparatus for outputting a sequence of vectors according to the present invention.

FIG. 5 is a block diagram showing the structure of a data processor such as a general purpose computer which acts as an apparatus for outputting a sequence of vectors according to an embodiment of the present invention.

A data processor 301 is under control of a CPU (Central Processing Unit) 302. A main storage 303 such as a RAM (Random Access Memory) stores temporary data, and an external storage such as a hard disk, a floppy disk, a CD-ROM (Compact Disc Read Only Memory), a magnetic tape and a magneto-optical disk stores programs to be executed by the CPU 302.

Upon the data processor 301 is turned on, the CPU 302 executes a boot program stored in a ROM (Read Only Memory) 308. Upon the boot program execution, programs such as OS (Operating System) and various application programs stored in the external storage 304, etc. are loaded to the main storage 303, and the CPU 302 executes them.

Files including results of the execution will be stored in the external storage 304, or the results will be displayed on a display 305 such as a CRT (Cathode Ray Tube) display, and a liquid crystal display. A user inputs commands to the data processor 301 through an input device 306 such as a mouse and a keyboard.

Figure 1:
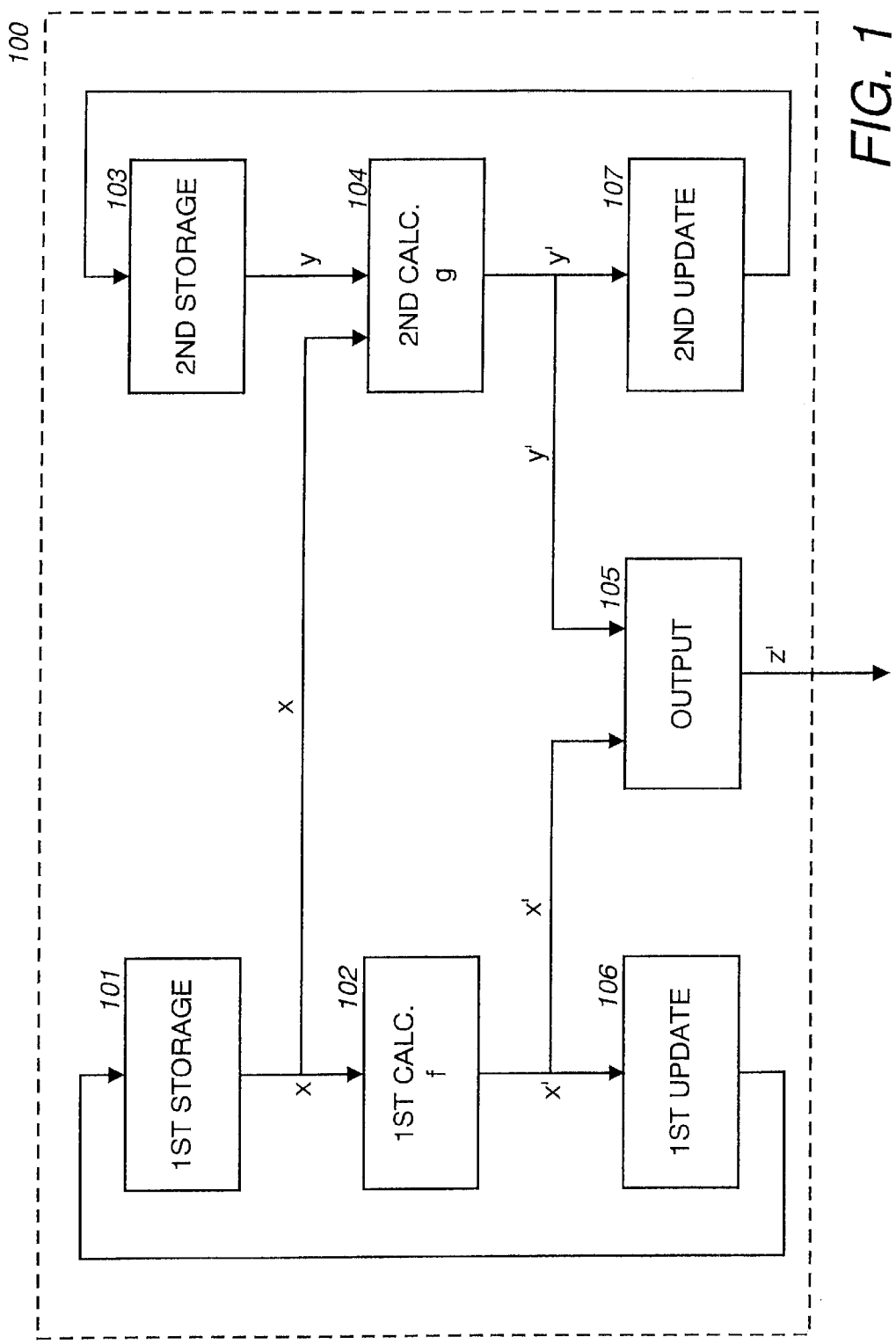
FIG. 1 is a block diagram showing the structure of an apparatus for outputting a sequence of vectors according to a first aspect of the present invention.
Figure 2:
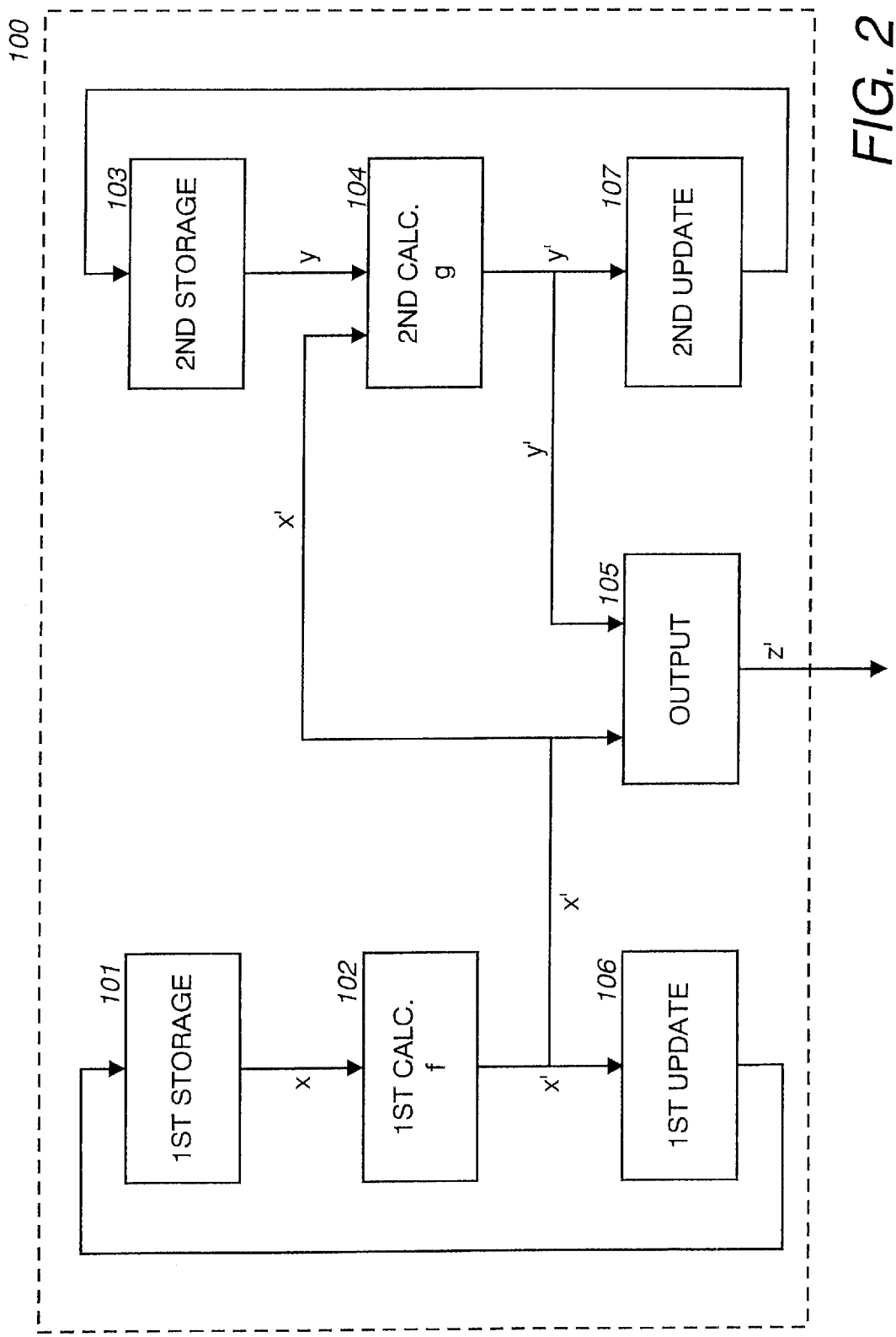
FIG. 2 is a block diagram showing the structure of an apparatus for outputting a sequence of vectors according to a second aspect of the present invention.

In a case where the data processor 301 acts as the apparatus 100 for outputting a sequence of vectors shown in FIGS. 1 and 2, the main storage 303 acts as the first and second storage 101 and 103; the CPU 302 acts as the first calculator 102, the second calculator 104, the first update 106, and the second update 107; the external storage 304 acts as the output 105 when saving the result files; the display 305 acts as the output 105 when displaying the results; and the main storage 303 acts as the output 105 when sharing the results with other programs.

Figure 3:
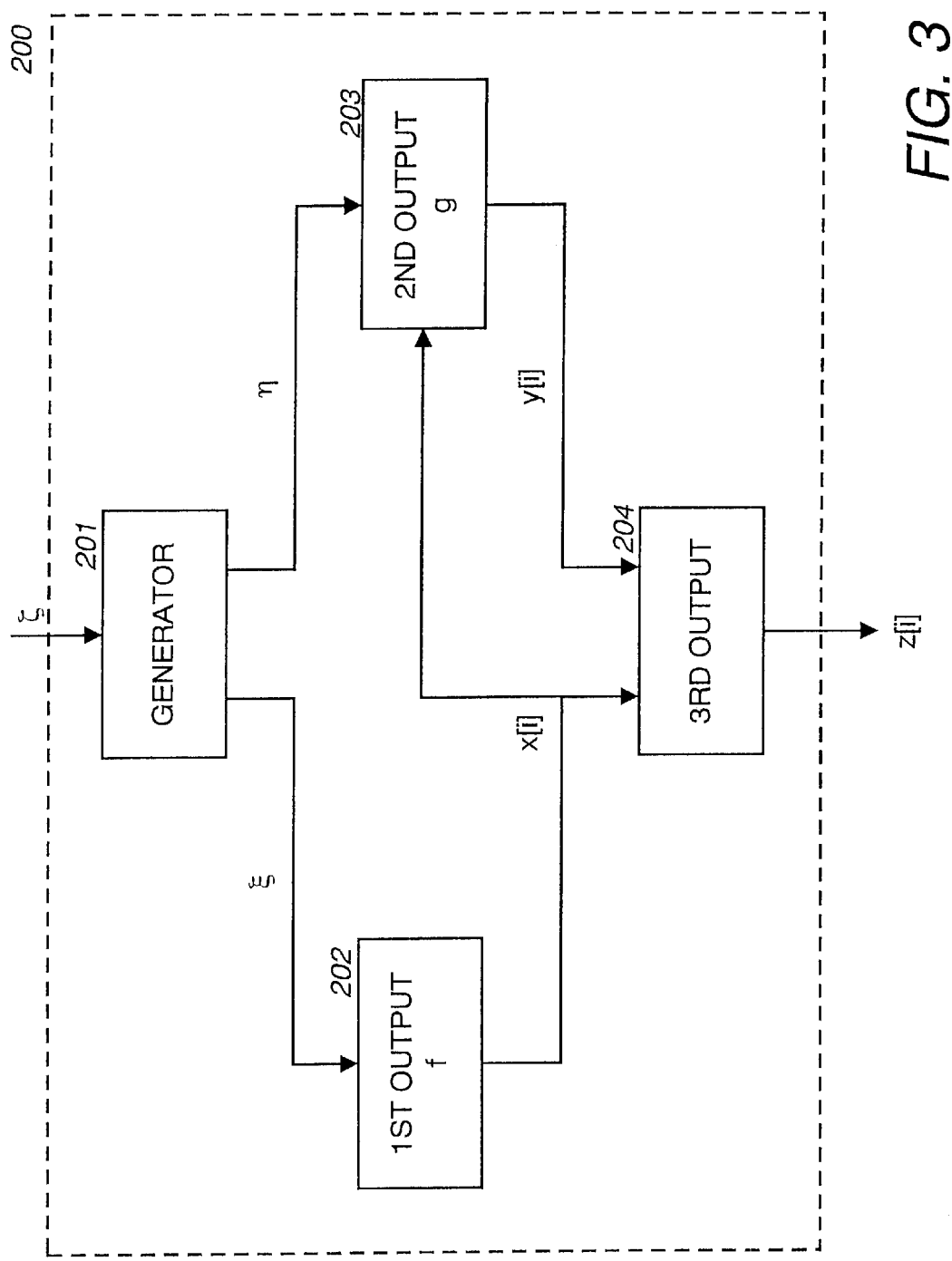
FIG. 3 is a block diagram showing the structure of an apparatus for outputting a sequence of vectors according to a third aspect of the present invention.
Figure 4:
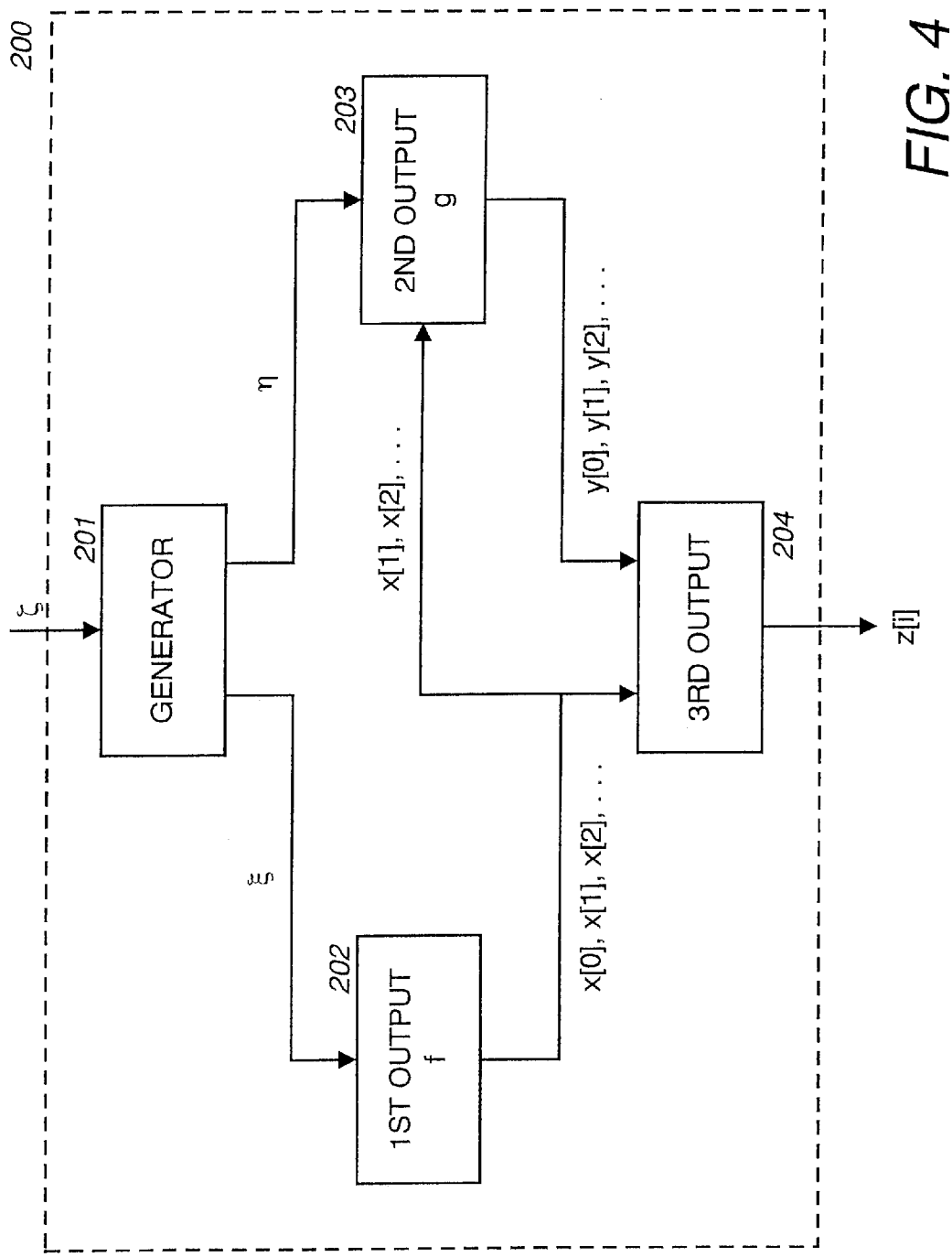
FIG. 4 is a block diagram showing the structure of an apparatus for outputting a sequence of vectors according to a fourth aspect of the present invention.

In another case where the data processor acts as the apparatus 200 for outputting a sequence of vectors shown in FIG. 3, the CPU 302 collaborates with the main storage 303 (the external storage 304 and the display 305 as needed) to act as the generator 201, the first output 202, the second output 203, and the third output 204.

The main storage 303 and the external storage 304 act as the data recording medium according to the present invention. The ROM 308 may act as the data recording medium according to the present invention.

Figure 6:
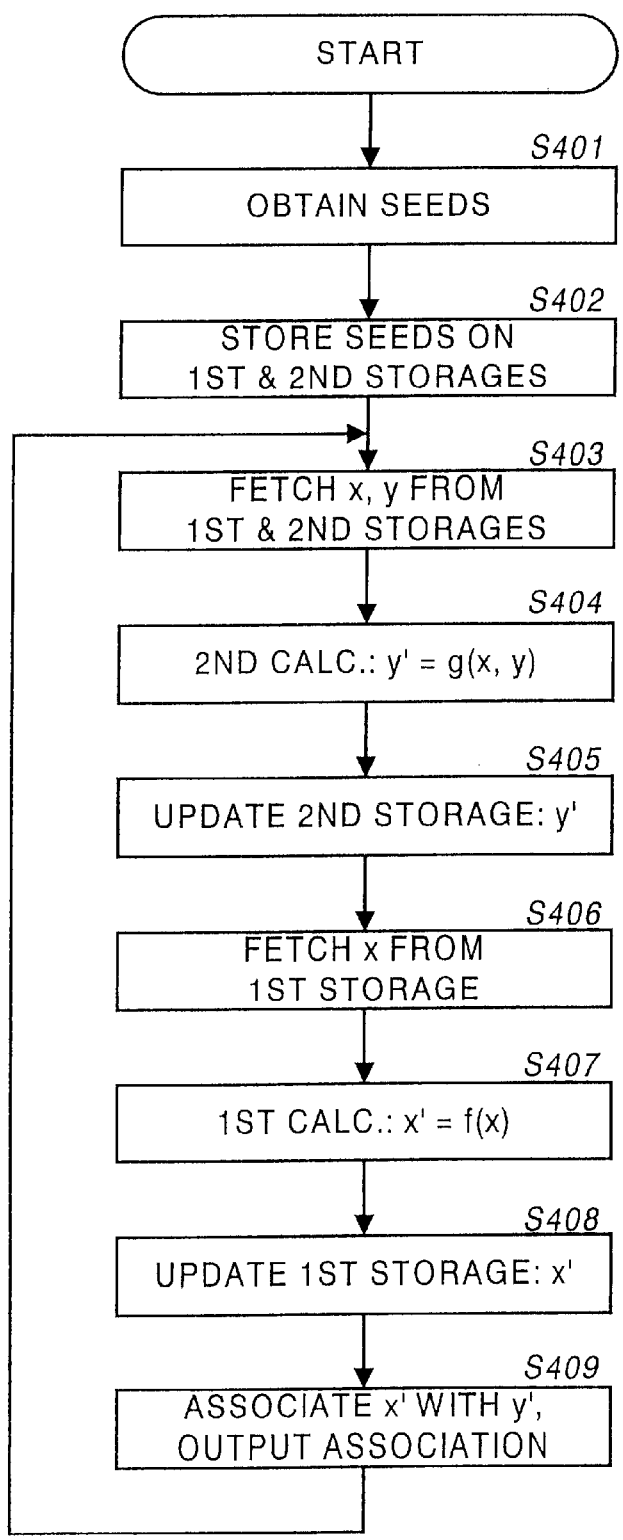
FIG. 6 is a flowchart showing the steps executed by the apparatus for outputting a sequence of vectors according to the present invention.

A process flow executed by the apparatus for outputting a sequence of vectors according to the present invention will now be described with reference to FIG. 6. FIG. 6 is a flowchart showing the process flow of the present invention.

For the sake of simple explanation, Ulam-von Neumann map (see equation 1) and Katsura-Fukuda map are exemplified hereinafter as the rational map f and the rational map g respectively. However, those skilled in the art may easily modify the embodiment so as to employ other maps, and such the modified embodiments are included in the scope of the present invention.

The CPU 302 obtains a time value or the like as a seed for the random number (step S401). In this case, a sequence of scalars (1-dimensional vectors) is input to the rational map f, and another sequence of scalars (1-dimensional vectors) and a parameter are input to the rational map g. Therefore, two different seeds for the scalars are required. In other words, the seeds for the random number are 2-dimensional vectors.

The user may input the seeds for the random number through the input device 306. And the input seeds may be associated with the time value. This method is helpful for generating a public key for encryption.

The CPU 302 transfers the seeds to the first storage 101 and the second storage 103 respectively (step S402). Thus, an initial value for the random number generation is set.

Steps S401–S402 correspond to process executed by the generator 201 in the apparatus 200 for outputting a sequence of random vectors shown in FIG. 3.

Then the CPU 302 fetches a value x stored in the first storage 101 and a value y stored in the second storage 103 (step S403), and calculates y'=g(x, y) (step S404). The CPU 302 updates the second storage 103 by storing the resultant value y' (step S405).

That is, the CPU 302 acts as the second calculator 104 in step S404.

The CPU 302 further fetches the value x stored in the first storage 101 (step S406), and calculates x'=f(x) (step S407). The CPU 302 updates the first storage 101 by storing the resultant value x' (step S408).

That is, the CPU 302 acts as the first calculator 102 in step S407.

Finally, the CPU 302 associates the value x' in the first storage 101 with the value y' in the second storage 103, and outputs a resultant value to the external storage 304 or the like (step S409). Then, the flow returns to step S403.

A result after associating n-dimensional vector with another m-dimensional vector is (n+m)-dimensional vector. Element of the result includes laid elements of the n-dimensional vector, and laid elements of the m-dimensional vector follows thereto. Process executed by the generator 201 in the apparatus 200 for outputting a sequence of vectors shown in FIG. 3 is realized by disassociating the vectors.

Random (m+n)-dimensional vectors will be output to the external storage 304 after repeat execution of the above steps.

The relationships between process executed by the first to third outputs 202–204 in the apparatus 200 for outputting a sequence of vectors shown in FIG. 3 and steps shown in FIG. 6 are as follows:

the first output 202 executes steps S406 to S408; the second output 203 executes steps S403 to S405; and the third output 204 executes step S406.

Figure 7:
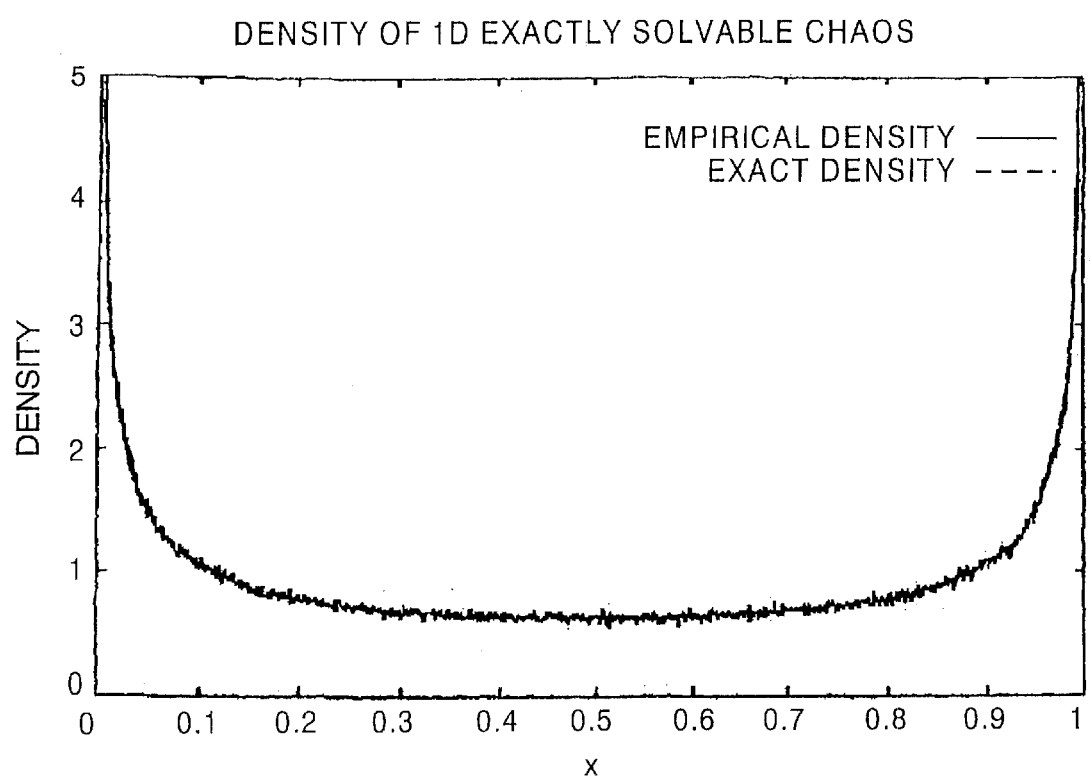
FIG. 7 is a graph showing density function of random number distribution when the generalized Ulam-von Neumann map is applied to the recurrence formula.

As mentioned above, the generalized Ulam-von Neumann map (see equation 1) is employed as the rational vector map f in this embodiment. FIG. 7 shows a result of a density function expressing random number distribution where the generalized Ulam-von Neumann map is employed as a recurrence formula. As shown in FIG. 7, the density function shows ununiformed result in the range of $0 \leq x \leq 1$ (concave up where $0<x<1$; infinite where $x=0$ and $x=1$).

As mentioned above, the Katsura-Fukuda function (equation 7) is employed as the rational vector map g in this embodiment. The random number distribution is analytically expressed by equation 8 when the Katsura-Fukuda function is employed as a recurrence formula where the parameter x' is fixed.

$$g(x', y) = \frac{4y(1-y)(1-x'y)}{(1-x'y^2)^2} \qquad \text{EQUATION 7}$$

$$v(x, y) = \frac{1}{K(x)\sqrt{y(1-y)(1-xy)}} \qquad \text{EQUATION 8}$$

where $$K(x) = \int_0^1 \frac{du}{\sqrt{(1-u^2)(1-xu^2)}}$$

Figure 8:
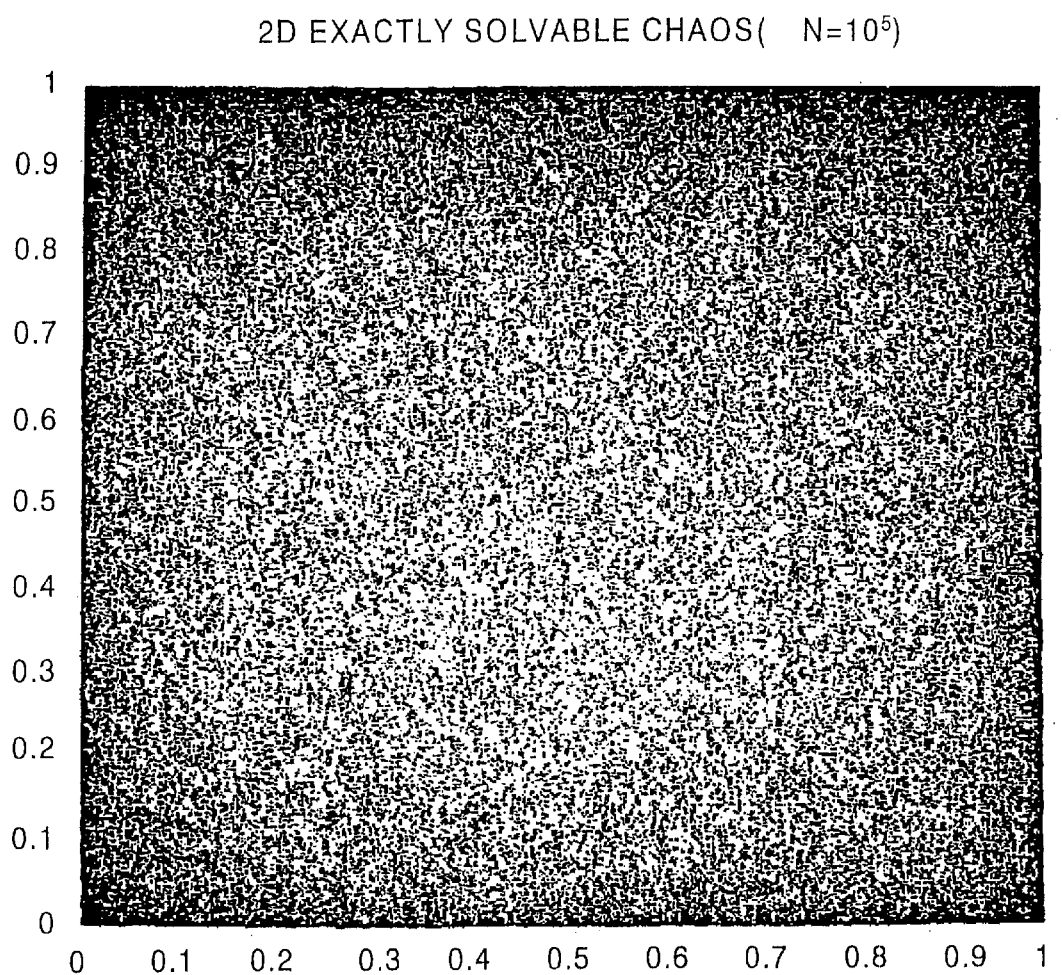
FIG. 8 is a diagram showing plotted coordinates represented by two-dimensional vectors output at step S409 in the flowchart shown in FIG. 6.
Figure 9:
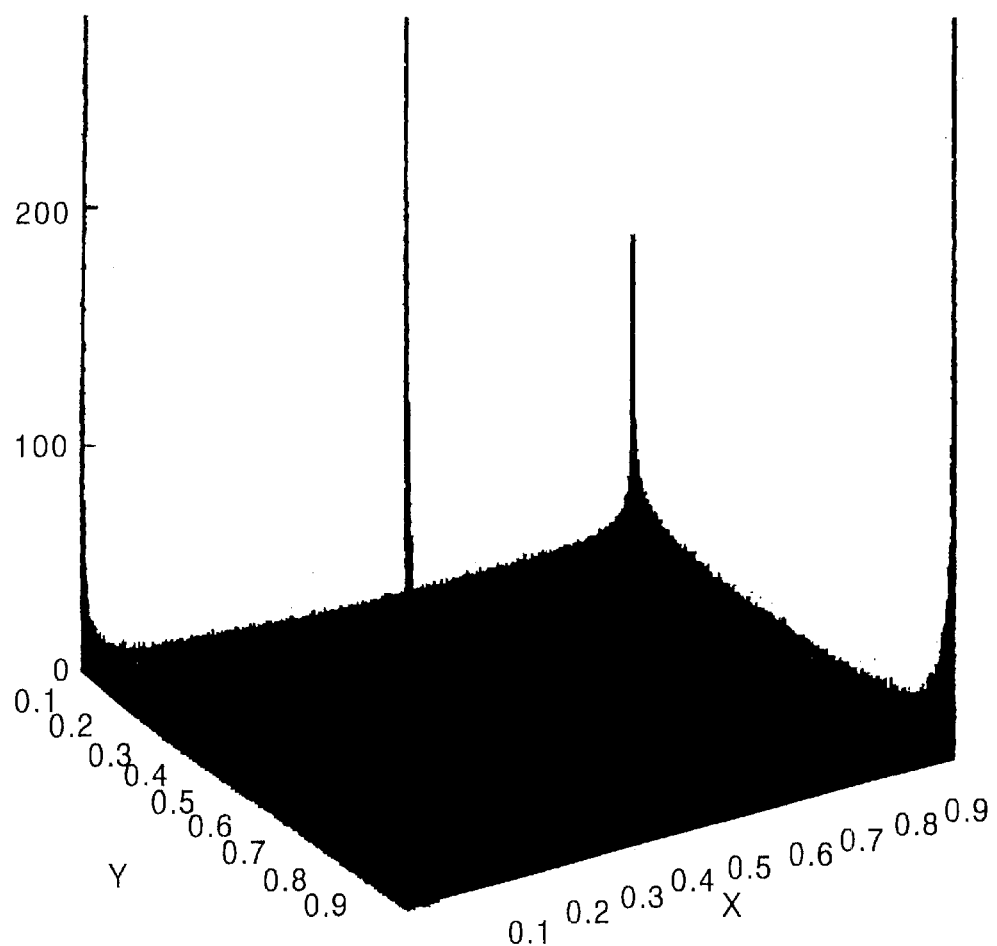
FIG. 9 is a histogram whose coordinates are the two-dimensional vectors output at step S409 in the flowchart shown in FIG. 6.
Figure 10:
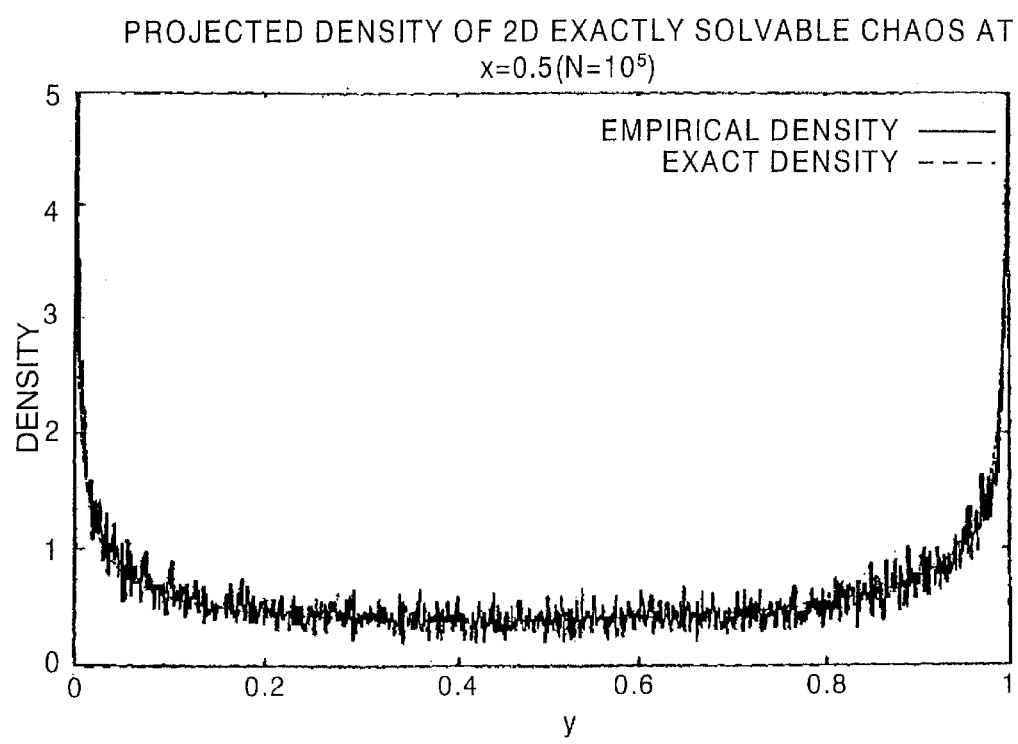
FIG. 10 is a graph representing a cross section of the histogram shown in FIG. 6.

FIG. 8 is a diagram showing sequentially plotted dots whose coordination is represented by 2-dimensional vectors output at step S409. FIG. 9 is a histogram whose coordination is represented by the 2-dimensional vectors output at step S409. FIG. 10 shows a cross section of the histogram shown in FIG. 9.

The inventor mathematically proved the following fact:

"Generally, when a rational ergodic map f having a density function p(x) and a rational ergodic map g(x, •) having a parameter x and a density function v(x, y) are associated with each other by the method of the present invention which utilizes a recurrence formula, a density function expressing limiting distribution of the output vector sequence will be v(x, y)ρ(x)."

That is, if known analytic density functions expressing limiting distribution are associated with each other, the resultant density function of limiting distribution will be a product of the original density functions. Therefore, the resultant density function is rev analytically available.

The above fact is also proved by the graph shown in FIG. 10 because it shows the shape which is almost the same as the shape of the graph shown in FIG. 7. Moreover, the method of the present invention realizes less deflection of random numbers than that caused by the conventional techniques.

Modified order of the process flow, parallel execution of separated process flow, or the like may realize the same effect of the present invention. Such the modification is included in the scope of the invention.

Second Embodiment

In the first embodiment, the apparatus for outputting a sequence of vectors was the data processor such as a general purpose computer. An electronic circuit which acts as the apparatus for outputting a sequence of vectors will be described in a second embodiment.

Flip-flop type storage circuits act as the first storage 101 and the second storage 103 in the apparatus 100 for outputting a sequence of vectors shown in FIG. 1.

A combination of an addition circuit and a multiplication circuit acts as the first and second calculators 102 and 104.

Output lines of the circuit acting as the second calculator 104 act as the output 105.

To realize function of the first and second updates 106 and 107, constantly delaying clock of signals output from the output lines of the circuit acting as the first and second calculators 102 and 104, and storing the delayed outputs in the first and second storage 101 and 103 as feedback.

Such the circuit based device for outputting a sequence of vectors according to the present invention will be helpful to apply the present invention to a device such as a PDA and a mobile phone which requires simple and small structure with less power consumption.

Third Embodiment

In the above embodiments, rational maps obtained by addition theorem for the elliptic function have been applied. Some of other maps obtained by elliptic integral, hyperelliptic integral or their modifications have the similar characteristics, therefore, such the maps may be utilized. Or, another map which represents a recurrence formula for the conventional random number generating technique may be utilized.

Fourth Embodiment

An inverse function technique established by von Neumann may generates a sequence of uniformly distributed random vectors based on the sequence of random vectors (regardless of their dimensions) obtained by the present invention, because the density function expressing the sequence of random vectors is analytically available.

Fifth Embodiment

Another available technique which is helpful to realize the present invention is data streaming. The data streaming is a major technique for OS such as UNIX, logical languages such as prolog and GHC, functional languages such as Lisp and Haskell, and the like. More precisely, the present invention will be realized after preparing the following data streaming processes A and B regarding to the rational vector maps f and g.

The process A generates streamed data for a sequence of vectors x[i] (process A is expressed as Predicate, Function, Procedure, or the like in the programming language).

Process A:

$x[0], x[1], x[2], x[3], \ldots$ $x[0] = \zeta$ $x[i+1] = f(x[i])$ (where $i \geq 0$)

And the following process B generates streamed data for a sequence of vectors y[i] after receiving the streamed data x[i] output by process A.

Process B:

$y[0], y[1], y[2], y[3], \ldots$ $y[0] = \eta$ $y[i+1] = g(x[i], y[i])$ (where $i \geq 0$)

Communication between process A and process B may be described by so-called Producer-Consumer model, and known techniques such as generation on demand, and streamed data buffering may be applicable to the communication technique.

Sixth Embodiment

In the above embodiments, resultant values after repeated calculations were used, that is, the following calculation was carried out for a case where the rational vector map g is utilized.

$y' = g(x, y)$ $y[i+1] = g(x[i], y[i])$

In this embodiment, the following recurrence formula will be employed instead of the above.

$y' = g(x', y)$ $y[i+1] = g(x[i+1], y[i])$

Effects brought by this embodiment are the same as those by the above embodiments.

As described above, the present invention brings the following effects.

The present invention provides an apparatus and a method for outputting a sequence of higher dimensional vectors whose limiting distribution is expressed by a known analytic density function, by associating two vector sequence generating methods by which sequences of random vectors whose limiting distribution is expressed by a known analytic function are output.

Moreover, the present invention realizes easy observation of distribution characteristics, because the density function for limiting distribution of the resultant sequence of higher dimensional random vectors is represented by a product of the density functions expressing limiting distribution of a vector sequence generated by the known methods. This effect may be applicable to various fields. In a case where rational maps are utilized as the known generation methods, all elements in the resultant sequence of vectors will be rational numbers. This effect is helpful to strictly keep calculation accuracy of a computer.

The sequence of random vectors generated by the present invention may be applicable to Monte-Carlo method, CDMA technology for mobile or optical communications, public key encryption for telecommunications via internet etc, and the like.

Furthermore, a data recording medium storing a program which realizes the present invention may be merchandized or distributed as a software package separated from a data processor. The program stored in the data recording medium according to the present invention will be executed by a data processor such as a general purpose computer in order to realize the apparatus and the method for outputting a sequence of vectors according to the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. H11-85744 filed on Mar. 29, 1999 and H11-362203 filed on Dec. 21, 1999, and including specification, claims, drawings and summary. The disclosure of the above Japanese Patent Application is incorporated herein by reference in its entirety.

What is claimed is:

1. An apparatus for outputting a sequence of vectors comprising:
   (a) a first storage which stores vector x of dimension at least 1;
   (b) a first calculator which calculates vector x'=f(x) which utilizes a first rational vector map f to which the vector x stored in said first storage is input;
   (c) a second storage which stores vector y of dimension at least 1;
   (d) a second calculator which calculates vector y'=g(x', y) which utilizes a second rational vector map to which the vector x' resulting from said first calculator and the vector y of dimension at least 1 stored in said second storage are input;
   (e) an output which outputs z' which is association of the vector x' resulting from said first calculator and the vector y' resulting from said second calculator;
   (f) a first update which updates said first storage by storing the vector x' resulting from said first calculator; and
   (g) a second update which updates said second storage by storing the vector y' resulting from said second calculator,
   where the rational vector map is a map which converts vector of dimension at least 1 having rational number components into another vector of dimension at least 1 having rational number components.

2. The apparatus according to claim 1, wherein a density function which expresses limiting distribution of a sequence of vectors x, f(x), f(f(x)), f(f(f(x))), . . . which are obtained after applying 0 or more times the vector x of dimension at least 1 to the first rational vector map f, is represented by an analytic function, and a density function expressing limiting distribution of a sequence of vectors y, g($\lambda$, y), g($\lambda$, g($\lambda$, y)), g($\lambda$, g($\lambda$, g($\lambda$, y))), . . . which are obtained after applying 0 or more times the vector y of dimension at least 1 to the second rational vector map g($\lambda$, •) to which vector $\lambda$ of dimension at least 1 is input as a parameter, is represented by an analytic function having the parameter $\lambda$.

3. The apparatus according to claim 2, wherein the first rational vector map f is obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

4. The apparatus according to claim 2, wherein the second rational vector map g is obtained by an additional theorem of the elliptic function, especially, one of Katsura-Fukuda map, generalized Ulam-von Neumann map, generalized cubic map, and generalized Chebyshev map.

5. An apparatus for outputting a sequence of vectors comprising:
   (a) a generator which receives vector $\zeta$ of dimensions at least 2, and generates vector $\xi$ of dimension at least 1 and vector $\eta$ of dimension at least 1;
   (b) a first output which outputs vectors x[i] obtained by the vector $\zeta$ generated by said generator and the following recurrence formula which utilizes a first rational vector map f $x[0]=\zeta$ $x[i+1]=f(x[i])$ (where $i \geq 0$);

(c) a second output which outputs vectors y[i] obtained by the vectors x[i] generated by said first output and the following recurrence formula which utilizes a second rational vector map g $y[0]=\eta$ $y[i+1]=g(x[i+1], y[i])$ (where $i \geq 0$); and (d) a third output which outputs vectors z[i] which is association of the vectors x[i] output by said first output and the vectors y[i] output by said second output.

6. The apparatus according to claim 5, wherein a density function expressing limiting distribution of a sequence of vectors x, f(x), f(f(x)), f(f(f(x))), . . . which are obtained after applying 0 or more times the vector x of dimension at least one to the first rational vector map f, is represented by an analytic function; and a density function expressing limiting distribution of a sequence of vectors y, g($\lambda$, y), g($\lambda$, g$\lambda$, y)), g($\lambda$, g($\lambda$, g($\lambda$, y))), . . . which are obtained after applying 0 or more times the vector y of dimension at least 1 to the second rational vector map g($\lambda$, •) to which vector $\lambda$ of dimension at least 1 is input as a parameter, is represented by an analytic function having the parameters $\lambda$.

7. The apparatus according to claim 6, wherein the first rational vector map f is obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

8. The apparatus according to claim 6, wherein the second rational vector map g is obtained by an additional theorem of the elliptic function, especially, one of Katsura Fukuda map, generalized Ulam-von Neumann map, generalized cubic map, and generalized Chebyshev map.

9. A carrier wave in which has been embedded a signal representing a program which executes:

(a) the first calculation step of calculating vector $x'=f(x)$ which utilizes a first rational vector map f to which vector x of dimension at least 1 stored in a first storage;

(b) the second calculation step of calculating vector $y'=g(x', y)$ which utilizes a second rational vector map g to which the vector x' resulting from said first calculation step and vector y of dimension at least 1 stored in a second storage are input;

(c) the output step of outputting vector I which is association of the vector x' resulting from said first calculation step and the vector y' resulting from said second calculation step;

(d) the first update step of updating said first storage by storing the vector x' resulting from said first calculation step; and (e) the second update step of updating said second storage by storing the vector yt resulting from said second calculation step.

10. The carrier wave according to claim 9, wherein a density function which expresses limiting distribution of a sequence of vectors x, f(x), f(f(x)), f(f(f(x))), . . . which are obtained after applying 0 or more times the vector x of dimension at least 1 to the first rational vector map f, is represented by an analytic function, and a density function expressing limiting distribution of a sequence of vectors y, g(X, y), g($\lambda$, g($\lambda$, y)), g($\lambda$, g($\lambda$, g($\lambda$, y))), . . . which are obtained after applying 0 or more times the vector y of dimension at least 1 to the second rational vector map g($\lambda$, •) to which vector $\lambda$ of dimension at least 1 is input as a parameter, is represented by an analytic function having the parameter $\lambda$.

11. The carrier wave according to claim 10, wherein the first rational vector map f is obtained by an addition theorem of the elliptic function, especially, one of Ulam-von Neumann map, cubic map, and quintic map, or one of Katsura-Fukuda map, generalized Ulam-von Neumann map, generalized cubic map and generalized Chebyshev to each of which a predetermined parameter is applied.

12. The carrier wave according to claim 10, wherein the second rational vector map g is obtained by an additional theorem of the elliptic function, especially, one of Katsura-Fukuda map, generalized Ulam-von Neumann map, generalized cubic map and generalized Chebyshev map.

* * * * *